United States Patent
Sarshar et al.

(10) Patent No.: US 9,073,064 B2
(45) Date of Patent: Jul. 7, 2015

(54) CYCLONIC SEPARATION SYSTEM COMPRISING GAS INJECTION MEANS AND METHOD FOR SEPARATING A FLUID MIXTURE

(75) Inventors: Mir Mahmood Sarshar, Beaconsfield (GB); Mirza Najam Ali Beg, Milton Keynes (GB); Carl Wordsworth, Bedford (GB)

(73) Assignee: Caltec Limited, Cranfield (GB)

( * ) Notice: Subject to any disclaimer, the term of this patent is extended or adjusted under 35 U.S.C. 154(b) by 1120 days.

(21) Appl. No.: 13/003,842

(22) PCT Filed: Jul. 3, 2009

(86) PCT No.: PCT/GB2009/001670
§ 371 (c)(1),
(2), (4) Date: Mar. 16, 2011

(87) PCT Pub. No.: WO2010/007349
PCT Pub. Date: Jan. 21, 2010

(65) Prior Publication Data
US 2011/0174741 A1 Jul. 21, 2011

(30) Foreign Application Priority Data

Jul. 14, 2008 (GB) .................... 0812835.7

(51) Int. Cl.
*C02F 1/24* (2006.01)
*B01D 17/035* (2006.01)
(Continued)

(52) U.S. Cl.
CPC .............. *B04C 3/04* (2013.01); *B01D 17/0205* (2013.01); *B04C 3/06* (2013.01); *B03D 1/1418* (2013.01);
(Continued)

(58) Field of Classification Search
CPC . B01D 17/0205; C02F 1/24; C02F 2103/365; B04C 3/00; B04C 3/06; B04C 2009/008
USPC .............. 210/703, 788, 789, 221.2, 512.1
See application file for complete search history.

(56) References Cited

U.S. PATENT DOCUMENTS

| 3,600,817 A | 8/1971 | Klein |
| 3,759,324 A | 9/1973 | Mecusker |

(Continued)

FOREIGN PATENT DOCUMENTS

| EP | 0 313 197 | 4/1989 |
| EP | 0 717 818 | 5/1998 |

(Continued)

OTHER PUBLICATIONS

Miller et al.—"Water De-oiling in an Air-Sparged Hydrocyclone", Filtration and Separation Jul./Aug. 1983, pp. 279-280 and 282.*

(Continued)

*Primary Examiner* — Thomas M Lithgow
(74) *Attorney, Agent, or Firm* — Fay Sharpe LLP

(57) ABSTRACT

An apparatus for separating a fluid mixture includes a uniaxial cyclonic separator (2) having a separation chamber (18) for separating the fluid mixture by cyclonic action into a first fluid and a second fluid. An inlet (16) is located at a first end of the separation chamber (18) for receiving a fluid mixture, while a first outlet (22) for the first fluid and a second outlet (26) for the second fluid are located at a second end of the separation chamber. A gas injection means (12) is provided for injecting a gas into the fluid mixture to aid separation within the separation chamber (18). The gas injection may also be through an annular chamber surrounding the separator chamber (18). The gas in this case is introduced through a porous medium 130 via a gas supply line 136.

22 Claims, 2 Drawing Sheets

(51) Int. Cl.
    *B01D 17/038* (2006.01)
    *B03D 1/14* (2006.01)
    *B04C 3/04* (2006.01)
    *B01D 17/02* (2006.01)
    *B04C 3/06* (2006.01)
    *B04C 5/26* (2006.01)
    *B04C 7/00* (2006.01)
    *B04C 9/00* (2006.01)

(52) U.S. Cl.
    CPC .............. *B01D 17/0217* (2013.01); *C02F 1/24* (2013.01); *B03D 1/1425* (2013.01); *B04C 5/26* (2013.01); *B04C 7/00* (2013.01); *B04C 9/00* (2013.01); *B04C 2009/008* (2013.01)

(56) References Cited

U.S. PATENT DOCUMENTS

| | | | |
|---|---|---|---|
| 5,071,557 | A | 12/1991 | Schubert et al. |
| 5,690,812 | A * | 11/1997 | Britz et al. .................... 209/164 |
| 5,770,050 | A * | 6/1998 | Trefz et al. .................... 209/170 |
| 8,088,286 | B2 * | 1/2012 | Folkvang ....................... 210/703 |
| 8,317,904 | B2 | 11/2012 | Sarshar et al. |

FOREIGN PATENT DOCUMENTS

| | | |
|---|---|---|
| EP | 1 028 811 | 4/2002 |
| EP | 1 028 812 | 4/2002 |
| GB | 1 506 877 | 6/1971 |
| GB | 2 263 077 | 8/1994 |
| GB | 2 440 726 | 2/2008 |
| GB | 2 457 012 | 8/2009 |
| WO | WO 95/07414 | 3/1995 |
| WO | WO 97/40944 | 11/1997 |
| WO | WO 99/22872 | 5/1999 |
| WO | WO 99/22873 | 5/1999 |
| WO | WO 2004/026486 | 4/2004 |
| WO | WO2007/049244 A1 * | 5/2007 |

OTHER PUBLICATIONS

British Search Report dated Nov. 11, 2008 for Application No. GB0812835.7.

International Search Report mailed Oct. 12, 2009 for International application No. PCT/GB2009/001670.

Letter regarding Notification of Co-Pending Application No. 12/863,703, Jul. 26, 2013.

* cited by examiner

CYCLONIC SEPARATION SYSTEM COMPRISING GAS INJECTION MEANS AND METHOD FOR SEPARATING A FLUID MIXTURE

FIELD

This invention relates to a separation system for separating a fluid mixture, and a method of separating a fluid mixture. In particular, but not exclusively, it relates to a system for bulk separation of water from an oil-water mixture and a method thereof.

BACKGROUND

The produced oil from oil fields often contains some water. The amount of water produced can vary from close to nil to an extremely high value, for example close to 99% of the total produced fluids. The amount of water produced is usually expressed as a percentage of the total liquid phase and is referred to as the "water cut".

If the produced fluids include a high water cut, the demands on transportation and processing systems can be very high in comparison to the quantity of oil produced. It is therefore desirable to separate a substantial proportion of the water from the produced fluids immediately or very soon after production from the well. This process is referred to as bulk water removal.

The removed water must be sufficiently free of oil to allow for disposal. The required purity of the water will depend on the method of disposal. For example, if the water is to be re-injected into an oil reservoir, an oil content of 500-1000 parts per million (ppm) will generally be acceptable. However, if the water is to be discharged into the sea, a final oil content of 25 ppm or less will generally be required for environmental reasons.

Separation of oil and water is traditionally carried out in two or more stages. The first stage usually involves using conventional gravity separators. Gravity separators rely purely on gravity (one "g" force) to separate oil from water. A residence time varying from a few minutes to thirty minutes or more is often needed to achieve the first stage of water separation. The need for such a long residence time results in the separators being very bulky with very large fluid inventories.

The second stage of the separation process is usually carried out using hydrocyclones. Hydrocyclones are well known cyclonic separators with a steep conical shape, which are sometimes used for de-oiling water. Examples are described in GB2263077A and GB1506877. They are sometimes referred to as reverse-flow cyclonic separators because the separated phases move in opposite directions to outlets at opposite ends of the separator. Hydrocyclones can provide excellent separation when the oil content of the oil-water mixture is below about 1000 ppm. However, they cannot efficiently separate oil from water when the oil concentration is too high (for example, above 1%). Hydrocyclones also cause a big pressure loss, often exceeding 3 bar or more, which may be undesirable in an oil production installation.

Corrugated plate separators (CPIs) may also sometimes be used for final polishing of the separated water, prior to discharge.

Another type of cyclonic separator is the uniaxial cyclonic separator, in which the fluids flow in the same direction from an inlet at one end of the device to separate outlet chambers at the opposite end of the device. Examples are described in European patent applications EP0313197A and EP0717818A. However, tests using a uniaxial cyclonic separator have shown that this device can only partially separate oil from water, with the separated water still containing a significant quantity of oil. The oil content varies depending on the type and viscosity of the oil but may reach 2% to 5% of the mixture. This is too high to allow the fluids to be discharged without further treatment.

In our UK patent application No. 0801045.6 we describe a separation system for separating a fluid mixture, which includes a uniaxial cyclonic separator that provides a first separation stage and a reverse flow cyclonic separator that provides a second separation stage. We have found that by combining a uniaxial separator with a reverse flow separator in a two-stage separation system we can remove a substantial portion of the water from an oil-water mixture, where the removed water has a very low oil content. For example, we can remove 40-70% of the water from a 50:50 oil-water mixture, where the removed water has an oil content of 5000 ppm or less.

However, we have found that in certain circumstances it can be very difficult to achieve an oil content of 1000 ppm while still removing an acceptable proportion of the produced water, for example 40-70% of the water content. In this case, either the proportion of water removed will be too low (e.g. below 40%) to make the operation acceptable and economical, or the oil content of the removed water will be too high (above 1000 ppm) for it to be re-injected into a reservoir or delivered to a final water polishing system, prior to being discharged into the sea.

The main factors affecting the purity of the separated water may include one or more of the following:
- the water-cut (the produced water as a percentage of the total produced oil-water mixture),
- the viscosity of the produced oil,
- the chemical composition of the oil,
- the operating temperature,
- the salinity of the produced water, and
- the particle size and size distribution of oil and water droplets in the mixture.

There is therefore a need for a system that can separate water from an oil-water mixture and deliver all or part of the separated water with a very low oil content. Preferably, the system should be capable of removing approximately 40-70% of the water from an oil-water mixture, where the removed water has an oil content of 1000 ppm or less.

SUMMARY

According to the present invention there is provided an apparatus for separating a fluid mixture, the system including a uniaxial cyclonic separator having a separation chamber for separating the fluid mixture by cyclonic action into a first fluid and a second fluid, an inlet at a first end of the separation chamber for receiving a fluid mixture, a first outlet for the first fluid at a second end of the separation chamber, a second outlet for the second fluid at a second end of the separation chamber, and gas injection means for injecting a gas into the fluid mixture to aid separation within the separation chamber.

We have found that by injecting gas to form a mist of gas bubbles within the fluid mixture, we can remove a greater portion of the denser fluid from the less dense fluid, while at the same time increasing the purity of the denser fluid. For example, when separating water from a 50:50 oil-water mixture, we can remove 40-70% of the water, where the removed water has an oil content of 1000 ppm or less. This significantly reduces the load on downstream separators and process equipment and allows the separated oil-rich fluid to be transported, stored and processed far more efficiently. The removed water already has a very low oil content and can therefore be discarded either immediately if it is sufficiently clean, or after a further gravitational or cyclonic separation if required to reduce the oil content to 25-40 ppm for disposal to sea.

We have found that the introduction of gas bubbles provides the following advantages:

- The quality of the separated water can be improved and the amount of oil carried through with the separated water can be reduced.
- A larger proportion of the produced water can be separated while meeting the desired purity requirement for the separated water. For example, the quantity of water that can be removed with an oil content of no more than 1000 ppm can typically be increased from about 50% to 60-70% by the addition of gas bubbles.
- The separation capabilities of the apparatus can be extended to permit the separation of more viscous oil and oil-water mixtures, which are generally much more difficult to separate by conventional methods.

Neither a uniaxial separator nor a reverse-flow separator can achieve a similar degree of separation when operating alone. Conventional uniaxial separators can process fluids with a high oil content, but the separated water still has an oil content that is too high for disposal. Reverse-flow separators on the other hand can provide a very high degree of separation, but cannot operate efficiently if the oil content of the fluid entering the separator is too high (i.e. above 1000 ppm). The system according to the present invention overcomes these problems by providing a system in which gas is injected prior to or during cyclonic separation in a uniaxial type separator.

Advantageously, the gas injection means comprises means for injecting gas through a chamber wall of the separation chamber.

Advantageously, at least part of the chamber wall is porous or perforated. Advantageously, the uniaxial separator includes a gas injection chamber defined between the chamber wall and an outer wall.

Advantageously, the gas injection means comprises a gas injection device located upstream of the inlet chamber.

Advantageously, the gas injection device includes at least one nozzle for injecting gas in fine bubbles into the fluid mixture flowing into the inlet chamber.

Advantageously, the gas injection device includes a plurality of nozzles to generate more evenly distributed fine gas bubbles.

It is important that the gas injection device is capable of producing a mist of fine bubbles, which are spread substantially homogeneously throughout the fluid mixture. Both kinds of gas injection device described above are capable of achieving this.

The uniaxial cyclonic separator preferably includes a spiral-shaped inlet chamber, an elongate separation chamber and at least one spiral-shaped outlet chamber. Advantageously, the elongate separation chamber has a length in the range five to ten times its minimum diameter.

Advantageously, the apparatus includes a reverse flow cyclonic separator having an inlet for receiving the first fluid from the first outlet, a separation chamber for separating the second fluid by cyclonic action into a third fluid and a fourth fluid, an outlet for the third fluid and an outlet for the fourth fluid.

Advantageously, the separation system includes a second reverse flow cyclonic separator having an inlet for receiving the second fluid from the second outlet, a separation chamber for separating the second fluid by cyclonic action into a fifth fluid and a sixth fluid, an outlet for the fifth fluid and an outlet for the sixth fluid. The second reverse flow cyclonic separator balances the output pressures at the first and second outlets of the uniaxial cyclonic separator, enabling the system to compensates automatically for variations in the flow rate and/or composition of the incoming fluid mixture. It also serves to separate the second fluid into a fifth fluid and a sixth fluid, where the fifth fluid is denser than the sixth fluid. If the fifth fluid is sufficiently clean, it can be discarded, or it can be sent for further treatment with the third fluid.

The separation system may include a flow control device, for example a tuning valve, for controlling the flow through the third outlet. The system may include a sensor for sensing the composition of the third fluid and a control device for controlling operation of the flow control device according to the sensed composition of the third fluid. This allows the system to adjust the flow rate through the first reverse flow separator, so as to achieve a required degree of separation of the third and fourth fluids.

The reverse flow cyclonic separator is preferably substantially conical in shape, having a length in the range ten to twenty times its maximum diameter.

According to another aspect of the invention there is provided a separation system according to any one of the preceding statements of invention, for separating water from an oil-water mixture.

The oil-water mixture received at the inlet of the uniaxial cyclonic separator may comprise at least 1% oil, or at least 5% oil, or at least 10% oil, up to approximately 45% oil, by volume. In general the oil content can be up to a level that the mixture has water as the continuous phase. Advantageously, the third fluid comprises less than 1% oil, preferably less than 0.5% oil, more preferably less than 0.1% oil, by volume. The third fluid preferably comprises by volume 40-70% of the fluid mixture received at the first inlet.

According to another aspect of the invention there is provided a method of separating a fluid mixture, the method including injecting gas into the fluid mixture to form a mist of gas bubbles within the fluid mixture, subjecting the mixture of fluids and gas bubbles to cyclonic action within a uniaxial cyclonic separator to cause cyclonic separation of the fluid mixture into a denser first fluid and a less dense second fluid, and drawing off the first and second fluids separately from the uniaxial separator.

Advantageously, the gas is injected into the fluid mixture while subjecting the fluid mixture to cyclonic action.

Advantageously, the uniaxial separator includes a separation chamber and the gas is injected through a chamber wall of a cyclonic separation chamber.

Advantageously, the chamber wall is at least partially porous or perforated to allow uniform introduction of fine gas bubbles.

Advantageously, the gas is injected into the fluid mixture before subjecting the fluid mixture to cyclonic action.

Advantageously, the gas is injected through at least one nozzle located upstream of the uniaxial separator.

Advantageously, the injected gas comprises from 5 to 20% by volume of the fluid mixture.

Advantageously, the injected gas comprises bubbles have a maximum size in the range 1 to 100 microns, preferably 10-50 microns. Larger size bubbles still help the process, but less effectively.

Advantageously, the method includes delivering the first fluid to a reverse flow cyclonic separator, and separating the first fluid by cyclonic action into a third fluid and a fourth fluid, the third fluid being denser than the fourth fluid.

Advantageously, the method includes delivering the second fluid from the uniaxial cyclone to a second reverse flow cyclonic separator and separating the second fluid by cyclonic action into a fifth fluid and a sixth fluid, the fifth fluid being denser than the sixth fluid.

The method may include combining the fourth and sixth fluids. The method may include combining the fifth and third fluids. The method may include combining the fifth and sixth fluids.

The method may include sensing the composition of the third fluid and controlling the flow thereof according to the sensed composition of the third fluid.

The gas injection may also be introduced for the same reason at inlet to or along the conical wall of the reverse flow cyclones if the type of oil or the particle sizes of the oil bubbles are too small (typically 5-50μ), which makes removal of oil droplet in water more difficult.

According to another aspect of the invention there is provided a method according to any one of the preceding statements of invention, for separating water at least partially from an oil/water mixture.

The third fluid may comprise less than 1% oil, preferably less than 0.5% oil, more preferably less than 0.1% oil, by volume. The third fluid may comprise by volume 40-70% of the fluid mixture received at the first inlet.

After separating part of the produced water, the remainder of oil and water can be sent to a gravity separator for further separation. The performance of the gravity separator will then be improved as its total load is reduced and it is no longer overloaded. This allows a longer residence time for separating oil from the remaining water. The size of the gravity separator can thus be reduced significantly.

The first stage of separation using a uniaxial separator plays an important additional role in improving the distribution of oil droplets in the fluids before they are passed through the second stage reverse flow hydrocyclones.

In many cases part separation of oil from water takes place as the fluids pass at a relatively low speed through the upstream pipework. The nature of the pipework including bends, risers and up and down routing affects the distribution of oil in the mixture and causes variations in the size of oil and water droplets as the fluids enter the oil-water separation system. A wide variation in the instantaneous flow rates of the oil and water phases also affects the separation efficiency of the second stage hydrocyclones if the fluids are fed directly to them.

An important function of the first stage uniaxial separator is to split the flow into oil-rich and water-rich phases. In this way it minimises extreme variations in the oil content of the water-rich phase before it is fed to the hydrocyclone. A similar improvement in particle size distribution is experienced in the separated oil-rich phase.

In addition, it has been observed that by a combination of shearing effect and coalescence of fine oil droplets within the uniaxial separator, a more uniform distribution of droplet sizes is generated. The improvements in flow regime and particle size distribution before the fluids enter the second stage hydrocyclones significantly improve the separation efficiency of the hydrocyclones.

The uniaxial separator thus provides an improvement in the percentage of water recovered from the fluid mixture and a significant reduction in the oil content of the separated water. Typically the oil content of the separated water is reduced from 3,000 or 2,000 ppm to a value of about 500 ppm, and the quantity of water separated is increased from 50% or 60% to 70% or 80% of the total water produced.

Furthermore, if the system is designed so that the uniaxial separator is located in close proximity to the second stage hydrocyclones, this helps to maintain rotational flow in the fluids, which is important for aiding separation. The streamline flow helps to ensure a pressure balance between uniaxial separator and the hydrocyclones. Another benefit is an overall reduction in pressure loss, which is not achieved if the uniaxial separator is distant from the hydrocyclones.

BRIEF DESCRIPTION OF THE DRAWINGS

Certain embodiments of the invention will now be described by way of example, with reference to the accompanying drawings, in which.

DETAILED DESCRIPTION

Figure 1:
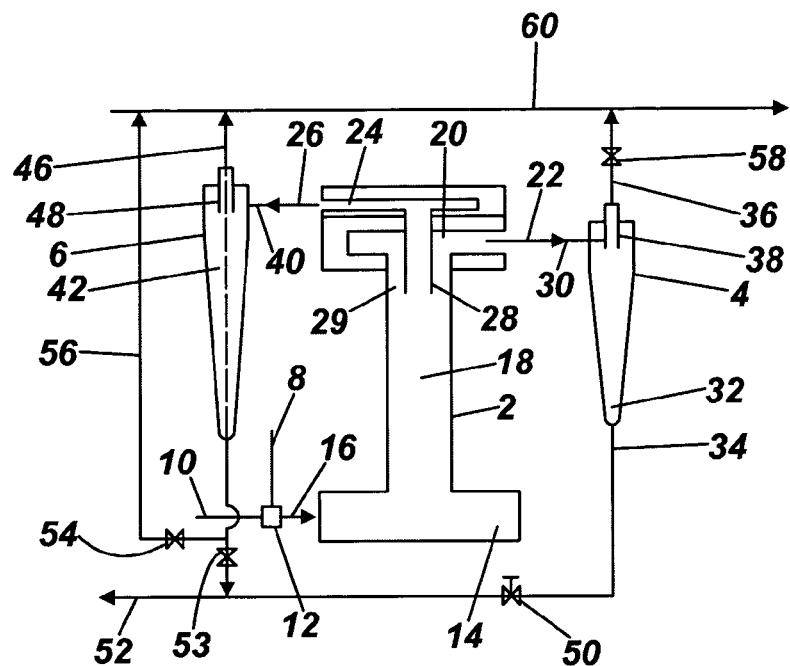
FIG. 1 is a schematic view of a first separation system for removing bulk water from an oil water mixture.

FIG. 1 shows a system for removing bulk water from an oil/water mixture, for example the produced fluids of an oil well. The system includes a uniaxial cyclonic separator 2, a first hydrocyclone 4 and a second hydrocyclone 6. A gas injection line 8 is provided for injecting gas into an inlet line 10 carrying produced fluids (a mixture of oil and water) through an injection device 12. The gas injection line 8 is connected to a source (not shown) of a suitable gas, for example a produced hydrocarbon gas or an inert gas.

The uniaxial cyclonic separator 2 is substantially conventional and may for example be similar to the separators described in EP1028811A, EP1028812A and GB2440726A, the contents of which are incorporated by reference herein. The uniaxial separator 2 includes an inlet chamber 14 having an inlet 16 for receiving the mixture of gas and liquids flowing through the inlet line 10, a separation chamber 18 for separating the mixture into a denser first fluid and a less dense second fluid, a first outlet chamber 20 with a first outlet 22 for the denser first fluid, and a second outlet chamber 24 with a second outlet 26 for the less dense second fluid. The second outlet chamber 24 is connected to the separation chamber 18 through an axial vortex finder tube 28, while the first outlet chamber has an annular inlet opening 29 that extends around the vortex finder tube.

The inlet chamber 14 and the outlet chambers 20,24 are involute in shape, the inlet 16 and the first and second outlets 22,26 each being substantially tangential to the respective chamber. The separation chamber 18 is circular in cross-section and has a length that is generally in the range five to ten times its internal diameter. The chamber may be of substantially uniform cross-section, or it may contain a narrow throat portion similar to that of the uniaxial cyclonic separator described in GB 0616101.2.

The first hydrocyclone 4 comprises a reverse flow cyclonic separator having an inlet 30, a separation chamber 32, a lower outlet 34 and an upper outlet 36. The inlet 30 is located at the upper end of the separation chamber 32 and is connected to the first outlet 22 of the uniaxial cyclonic separator 2 to receive the denser first fluid. The separation chamber 32 has a conical shape, the lower outlet 34 being located at the narrow lower end of the chamber, while the upper outlet 36 comprises an axial vortex finder tube 38 that is located at the wider upper end of the chamber 32. The length of the separation chamber 32 is preferably in the range ten to twenty times its maximum internal diameter.

The second hydrocyclone 6 also comprises a reverse flow cyclonic separator reverse flow cyclonic separator, which is similar to the first hydrocyclone 4 and comprises an inlet 40, a separation chamber 42, a lower outlet 44 and an upper outlet 46. The inlet 40 is located at the upper end of the separation chamber 42 and is connected to the second outlet 26 of the uniaxial separator 2 to receive the less dense second fluid. The separation chamber 42 has a narrow conical shape, the lower outlet 44 being located at the narrow lower end of the chamber, while the upper outlet 46 comprises an axial vortex finder tuber 48 that is located at the wider, upper end of the chamber 42.

The lower outlet 34 of the first hydrocyclone 4 is connected via a first flow control valve (or "tuning valve") 50 to a first outlet line 52 for denser water-rich fluids, while the upper outlet 36 is connected via a second flow control valve 58 to a second outlet line 60 for less dense oil-rich fluids. The lower outlet 44 of the second hydrocyclone 6 is connected via a first isolation valve 53 to the first outlet line 52, and via a second isolation valve 54 and a feed line 56 to the second outlet line 56. The upper outlet 46 of the second hydrocyclone 6 is connected to the second outlet line 60.

Figure 2:
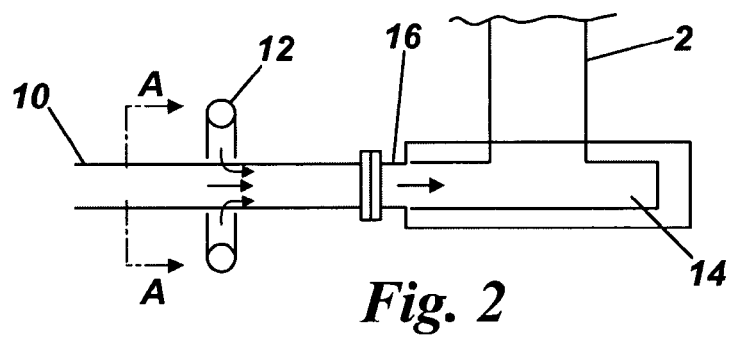
FIG. 2 is a side view showing part of the first separation system at a larger scale.
Figure 3:
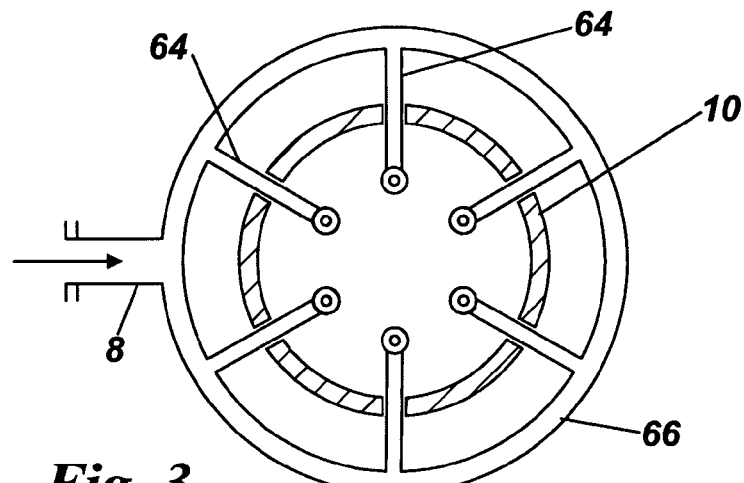
FIG. 3 is a cross-section on line A-A of FIG. 2.

The gas injection device 12 is shown in more detail in FIGS. 2 and 3. It includes a set of six injection nozzles 62 that are positioned within the fluid inlet line 10. Each nozzle 62 is connected to a branch line 64 that extends radially through the wall of the fluid inlet line 10 and is connected to a ring-shaped manifold 66, which is connected to the gas inlet line 8. Gas supplied through the gas inlet line 8 can be injected by the injection device 12 into the produced fluids flowing through the fluid inlet line 10. The nozzles 62 are designed to generate streams of very fine gas bubbles, for example having a size in the range 1 to 50 microns at the operating temperature and pressure.

In use, gas is injected via the injection device 12 into the produced fluids flowing through the fluid inlet line 10, producing a mist of very fine bubbles within the produced fluids. The quantity of gas injected may typically be in the range 5 to 20% by volume of the produced fluids although this is not necessarily the limit for all cases. The injected gas will normally be produced gas (i.e. hydrocarbon gas), where this is available. Otherwise, an inert gas such as Nitrogen may be injected. The gas is normally injected at a pressure that is higher than the operating pressure of the line 10. The injection gas pressure ideally should be equal to or above twice the pressure of the fluids passing through the inlet of the involute separator.

This mixture of fluids (the produced fluids and the injected gas) enters the uniaxial cyclonic separator 2 through the first inlet 16 and is caused to swirl around the axis of the separation chamber 18 by the involute shape of the inlet chamber 14. This causes the bubbles of gas to be distributed evenly throughout the produced fluids. The fluids then enter the separation chamber 18 where the swirling motion generates a very high "g" force, which causes the fluids to separate by cyclonic action into a denser first fluids and a less dense second fluid. The denser first fluid moves outwards away from the axis of the separation chamber 18 and flows into the first outlet chamber 20 through the annular opening 29, to exit through the first outlet 22. The less dense second fluid is forced inwards towards the axis of the chamber 18 and flows through the vortex finder tube 28 into the second outlet chamber 24, from where it exits through the second outlet 26. The involute shapes of the first and second outlet chambers restore the pressure of the first and second fluids, so that the pressure drop across the uniaxial separator 2 is minimal.

The presence of small gas bubbles within the fluid mixture entering the separation chamber 18 has been found to greatly improve the separation efficiency of the uniaxial separator 2. As the fluids rotate within the separation chamber 18, the oil and gas bubbles tend to be driven towards the axis of the chamber owing to their lower density, whereas the denser water tends to be driven outwards to walls of the chamber. It is believed that as the gas bubbles move towards the axis of the chamber, they drive the oil droplets in same direction, thereby increasing the speed at which the fluids separate. The denser first fluid flowing through the first outlet 22 is therefore water-rich, containing a high proportion of water and usually a small quantity of oil and gas, whereas the less dense second fluid flowing through the second outlet 26 is oil-rich, containing most of the oil and gas plus some produced water.

The denser first fluid (the water-rich fluid) flows from the first outlet 22 into the first hydrocyclone 4 through the inlet 30. The inlet 30 is arranged tangentially relative to the separation chamber 32, which causes the first fluid to swirl around the longitudinal axis of the chamber 32. This subjects the fluid to a high "g" force, which causes cyclonic separation of the first fluid into a third fluid and a fourth fluid, where the density of the third fluid is greater than that of the fourth fluid. Any gas bubbles remaining within the third fluid assist in the separation process, providing a higher degree of separation.

The third fluid moves outwards towards the circumferential wall of the separation chamber 32 and then flows downwards to the lower outlet 34 at the narrow lower end of the chamber 32 and into the first outlet line 52 through the first flow control valve 50. The fourth fluid, being less dense, is forced inwards towards the axis of the chamber 32 and exits through the axial vortex finder tube 38 and the upper outlet 36 at the wide upper end of the chamber 32, into the second outlet line 60.

The third fluid, being denser than the fourth fluid, has a high water content and a very low oil content, typically 1000 ppm or less. This fluid may still need one or two further stages of treatment before it is suitable for sea disposal, in order to achieve an acceptable oil content, for example 25 ppm or less. This last stage of separation can be achieved with conventional separation techniques, for example using hydrocyclones and/or corrugated plate interceptors (which do not form part of this patent application). The third fluid, being less dense, has a higher oil content and may if required be sent to a conventional gravity separator for further treatment.

The second fluid (comprising the less dense, oil rich fluid) flows from the second outlet 26 of the uniaxial separator 2 and through the inlet 40 of the second-flow hydrocyclone 6. The inlet 40 is arranged tangentially relative to the separation chamber 42, which causes the second fluid to swirl around the longitudinal axis of the chamber. This causes cyclonic separation of the second fluid into a fifth fluid and a sixth fluid, where the density of the fifth fluid is greater than that of the sixth fluid. Again, any gas bubbles remaining within the third fluid assist in the separation process, providing a higher degree of separation.

The fifth fluid therefore moves outwards towards the circumferential wall of the separation chamber and then flows downwards to the lower outlet 44 at the narrow lower end of the chamber 42. The fifth fluid can then be directed either through the first isolation valve 53 into the first outlet line 52 for water-rich fluids, or through the second isolation valve 54 and the feed line 56 into the second outlet line 60 for oil-rich fluids. The function of valve 53 is primarily for tuning the system and adjusting the back pressure on the water-rich outlet of cyclone 42, which in turn could affect the purity of water entering line 52. The sixth fluid, being less dense, is forced inwards towards the axis of the chamber 42 and exits through the axial vortex finder tube 48 and the upper outlet 46 at the wide upper end of the chamber 42, into the second outlet line 60.

The choice of flow path for the fifth fluid will depend on the oil content of the fifth fluid and the maximum permitted oil content of the water-rich fluids flowing through the first outlet line 52. Therefore, if the oil content of the fifth fluid is below the maximum permitted output level for the water-rich fluids, it will be directed into the first outlet line 52 to increase the proportion of water removed from the produced fluids. On the other hand, if the oil content of the fifth fluid is significantly above the maximum permitted output level for the water-rich fluids, it will generally be directed into the second outlet line 60 for oil-rich fluids. In certain circumstances, the fifth fluid may be directed partially into the first outlet line and partially into the second outlet line, providing that the oil content of the combined third and fifth fluids in the first outlet line 52 does not exceed the maximum permitted oil content for the output of the water-rich fluids.

The third fluid has the highest water content and the lowest oil content of all the separated fluids. Typically, for example, the third fluid will have an oil content of 1000 ppm or lower. The fifth fluid will also have a low oil content, although this may not be as low as that of the third fluid. The fourth fluid and the sixth fluid both have a relatively high oil content, the sixth fluid having the highest oil content.

The lower outlet 34 of the first hydrocyclone 4 is connected via the first flow control valve (or "tuning valve") 50 to the first outlet line 52 for water-rich fluids. This valve 50 may be used for tuning the system by throttling the flow of fluid through the outlet 34 to increase the degree of separation achieved by the first hydrocyclone 4 and reduce the oil content of the water-rich fluids flowing through the first outlet line 52.

The upper outlets 36,46 of the first and second hydrocyclones 4,6 are connected to the second outlet line 60 for oil-rich fluids. The fourth and sixth fluids are therefore combined in the second outlet line 60. The feed line 56 is also connected to the second outlet line 60 so that when the second isolation valve 54 is open, the fifth fluid flowing through the lower outlet 44 of the second hydrocyclone 6 is also combined with the oil-rich fluids in the second outlet line 60.

In use, the uniaxial cyclonic separator 2 provides a first separation stage, separating the oil-water mixture flowing through the first inlet 16 into a water-rich first fluid and an oil-rich second fluid. The water-rich first fluid is then further separated by the first hydrocyclone 4 to provide a third fluid comprising water with a very low oil content, and a fourth fluid with a higher oil content. The oil-rich second fluid also undergoes a secondary separation stage to provide a fifth fluid with a low oil content and a sixth fluid with a high oil content. The oil-rich fourth and sixth fluids are combined in the second outlet line 60 and sent for further processing, while the third fluid comprising water with a very low oil content is either discharged directly if the oil content is sufficiently low, or is sent for further cleaning for example in a conventional gravity separator before being discharged.

The fifth fluid may be combined either with the third fluid if the oil content of the fluid is sufficiently low, or with the fourth and sixth fluids and sent for further processing. In this way, the system can be controlled to remove a large portion (typically 40-70%) of the water in the oil-water mixture, thereby allowing the total volume of the oil-rich fluid sent for further processing to be substantially reduced. The removed water has a very low oil content, for example less than 1000 ppm, allowing it to be re-injected back into a suitable zone of the reservoir or sent for further cleaning prior to being discharged into the sea.

The second hydrocyclone 6 has two functions: the first being to separate the oil-rich fluids leaving through the second outlet 26 of the uniaxial separator 2, while the second is to balance the pressures in the first and second outlets 22,26 of the uniaxial separator at varying flow rates. An imbalance of pressures in the outlets will cause poor performance and excessive diversion of the fluid into the outlet line that offers less resistance (i.e. a lower back pressure). Because the first and second hydrocyclone 4,6 are of a similar design, they provide a passive flow control system that automatically balances the flow, even under varying flow rates and regimes.

Alternatively, the second hydrocyclone 6 may be omitted, in which case the second fluid flowing through the second outlet 26 of the uniaxial separator 2 will be delivered directly via the third flow control valve 62 located on line 40 into the second outlet line 60, where it will be combined with the fourth fluid. In this case the second and third flow control valves 52,54 and the feed line 56 will be omitted. However, it is preferable to include the second hydrocyclone 6, as this automatically balances the flow of fluids through the first and second outlets of the uniaxial separator 2 and so compensates for fluctuations in the composition and flow rate of the oil-water mixture flowing through the first inlet 16.

Another possibility is to omit both hydrocyclones. The separation system will then consist essentially of a uniaxial separator 2 and a gas injector 12 for injecting gas into the produced fluids flowing into the inlet 16 of the uniaxial separator 2. The degree of separation provided by the uniaxial separator 2 alone may be adequate for certain applications.

Preferably, the system includes a sensor (not shown) for sensing the composition of the third fluid and a control device for controlling operation of the first flow control valve 50 according to the sensed composition of the third fluid. This allows the valve 50 to be opened or closed incrementally, so as to control the degree of separation provided by the system. In this way, the oil content of the third fluid can be controlled, so that it is maintained within predetermined limits.

The system may also include a sensor (not shown) for sensing the composition of the fifth fluid and a control device for controlling operation of the second and third flow control valves 52,54 according to the sensed composition of the fifth fluid. This control system can determine whether the fifth fluid should be combined with the third fluid or with the fourth and sixth fluids, depending on the oil content of the fifth fluid. The system may also include sampling points via a sampling valve to collect fluids from the water-rich outlet lines of the cyclonic separators 4 and 6.

The system may also include a gas separator for separating the injected gas from the separated oil-rich and/or water-rich fluids. Any conventional gas separator may be employed downstream of the cyclonic separation system. The separated gas may then be re-cycled and re-injected through the injection device 12 to continue the separation process.

Various modifications of the system described above are possible. For example, the gas injection device may include more or fewer gas injection nozzles, or just a single nozzle. The nozzles may be located towards the centre of the inlet line or towards its periphery. The gas injection device may also be located further upstream or within or adjacent the inlet chamber. Multiple gas injection devices may be provided.

Figure 4:
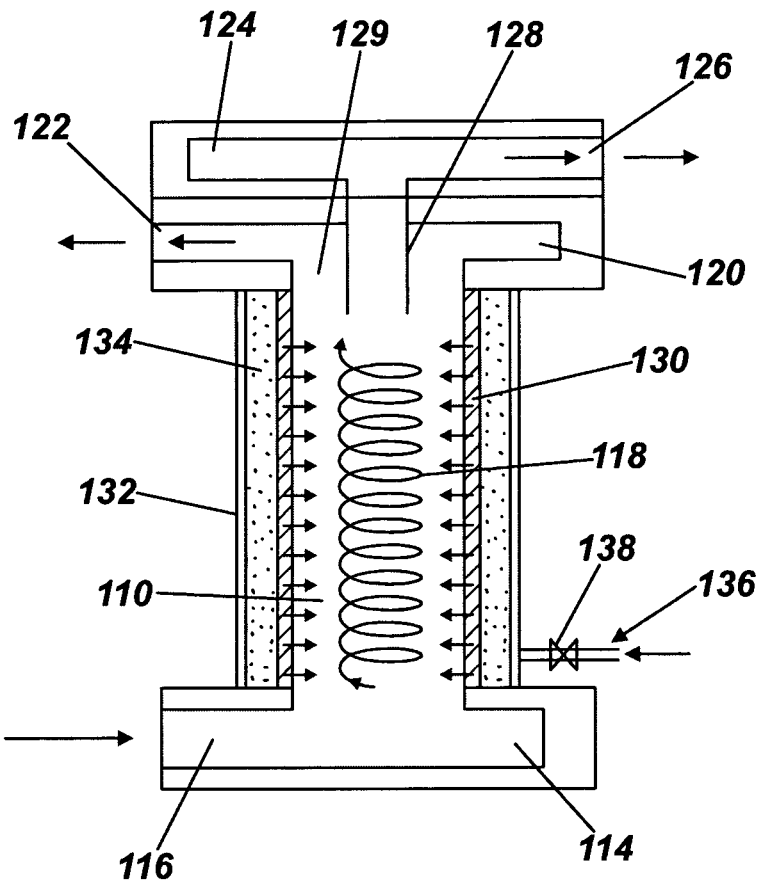
FIG. 4 is a sectional side view of a uniaxial separator according to a second embodiment of the invention.
Figure 5:
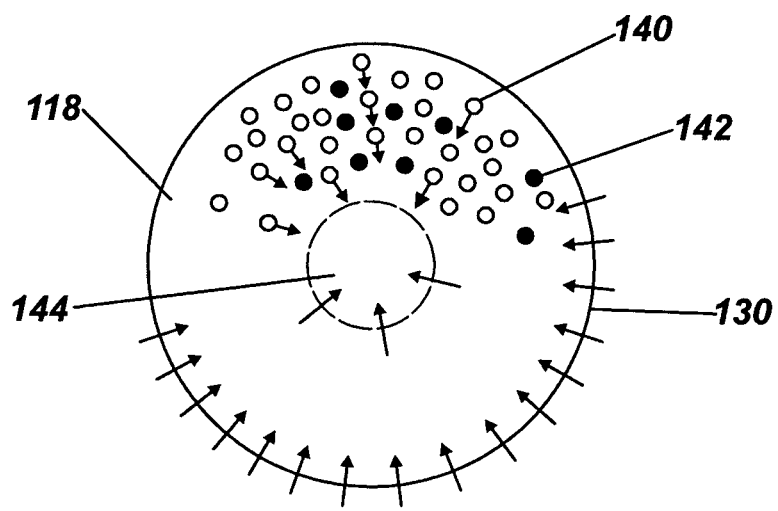
FIG. 5 is a cross-sectional view through the separation chamber of the uniaxial separator shown in FIG. 4.

A separation system according to a second embodiment of the invention is shown in FIGS. 4 and 5. In this embodiment, the uniaxial separator 102 is modified to include an integral gas injection device 110 in the form of a porous ceramic liner.

The uniaxial separator 102 includes an inlet chamber 114 having an inlet 116 for receiving the produced fluids, a separation chamber 118 for separating the fluids into a denser first fluid and a less dense second fluid, a first outlet chamber 120 with a first outlet 122 for the first fluid, and a second outlet chamber 124 with a second outlet 126 for the second fluid. The inlet chamber 114 and the outlet chambers 120,124 are involute in shape, the inlet 116 and the first and second outlets 122,126 each being substantially tangential to the respective chamber. The second outlet chamber 124 is connected to the separation chamber 118 through an axial vortex finder tube 128, while the first outlet chamber has an annular inlet opening 129 that extends around the vortex finder tube. The separation chamber 118 is circular in cross-section and has a length that is generally in the range five to ten times its internal diameter. The inlet and outlet chambers 116,122,126 are conventional and may for example be similar to those of the uniaxial separators described in EP1028811A, EP1028812A and GB2440726A.

Optionally, the first and second outlets 122,126 of the uniaxial separator 102 may be connected respectively to the inlets of first and second hydrocyclones 4,6 in a system as depicted in FIG. 1, where the uniaxial separator 102 replaces both the uniaxial separator 102 and the separate gas injection device 12 of the previous system. In other respects, the system will be substantially as described above.

As shown in FIGS. 4 & 5, the separation chamber 118 is defined by a cylindrical separation chamber wall 130, which is made of a porous material, for example a ceramic material. The chamber wall 130 is surrounded by an outer peripheral wall 132, defining an annular gas injection chamber 134 between the inner separation chamber wall 130 and the outer peripheral wall 132. The ends of the gas injection chamber 134 are closed by the walls of the inlet and outlet chambers 114,122. A gas inlet line 136 is connected through the peripheral wall 132 to deliver gas through a valve 138 into the gas injection chamber 134.

In use, the produced fluids enter the uniaxial cyclonic separator 102 through the first inlet 116 and are caused to swirl around the axis of the separation chamber 118 by the involute shape of the inlet chamber 114. The fluids then enter the separation chamber 118 where the swirling motion generates a very high "g" force, which causes the fluids to separate by cyclonic action into a denser first fluids and a less dense second fluid.

At the same time, a suitable injection gas (produced hydrocarbon gas or an inert gas) is injected at high pressure through the gas inlet 136 into the gas injection chamber 134 between the outer chamber wall 132 and the porous inner chamber wall 130. The gas pressure is chosen to be higher than the pressure of the fluids adjacent the inner surface of the chamber wall 130, so that the gas flows through the porous material of the chamber wall into the separation chamber 118, producing a mist of very fine bubbles 140 within the produced fluids. The quantity of gas injected may typically be in the range 5 to 20% by volume of the produced fluids. The gas is normally injected at a pressure that is between 2 and 20 bar (typically about 5 bar) higher than the pressure of the produced fluids adjacent the inner surface of the chamber wall.

The denser first fluid moves outwards away from the axis of the separation chamber 118 and flows into the first outlet chamber 120 through the annular opening 129, to exit through the first outlet 122. The less dense second fluid is forced inwards towards the axis of the chamber 118 and flows through the vortex finder tube 128 into the second outlet chamber 124, from where it exits through the second outlet 126. The involute shapes of the first and second outlet chambers restore the pressure of the first and second fluids, so that the pressure drop across the uniaxial separator 102 is minimal.

The presence of small gas bubbles 140 within the fluid mixture in the separation chamber 118 greatly improves the separation efficiency of the uniaxial separator 102. As the fluids rotate within the separation chamber 118, the oil droplets 142 and gas bubbles 140 tend to be driven towards the central core 144 of the vortex owing to their lower density, whereas the denser water tends to be driven outwards to walls of the chamber. It is believed that as the gas bubbles 140 move towards the core 144 of the vortex, they drive the oil droplets 142 in same direction, thereby increasing the speed at which the fluids separate. The denser first fluid flowing through the first outlet 122 is therefore water-rich, containing a high proportion of water and usually a small quantity of oil and gas, whereas the less dense second fluid flowing through the second outlet 126 is oil-rich, containing most of the oil and gas plus some produced water.

The bubbles 140 forming on the inner surface of the porous chamber wall 130 also reduce the hydrodynamic drag between the rotating fluids and the chamber wall 130, thereby allowing higher rotational speeds and improved cyclonic separation to be achieved.

Various modifications of the apparatus described above are possible. For example, instead of using a porous material such as ceramic, the chamber wall 130 may be perforated to allow gas to be injected into the separation chamber 118. The perforations will preferably be very small, for example smaller than 50 microns in diameter, to ensure that the bubbles are very small. Alternatively, one or more nozzles may be located within the separation chamber or the inlet chamber to inject gas directly into the produced fluids.

The porous or perforated wall 130 may extend over the either the whole entire length or only part of the length of the separation chamber. In the latter case, the porous/perforated wall is preferably located towards the inlet end of the separation chamber 118.

The invention claimed is:

1. An apparatus for separating water from an oil/water mixture, the apparatus including a uniaxial cyclonic separator comprising an elongate separation chamber for separating the oil/water mixture by cyclonic action into a first fluid and a second fluid, an inlet at a first end of the separation chamber for receiving the oil/water mixture, said inlet comprising a spiral-shaped inlet chamber, a first outlet for the first fluid at a second end of the separation chamber, a second outlet for the second fluid at the second end of the separation chamber, at least one of said first and second outlets comprising a spiral-shaped outlet chamber, and gas injection means for injecting a gas into the oil/water mixture to aid separation within the separation chamber, wherein the gas injection means comprises means for injecting gas through a chamber wall of the separation chamber, and wherein at least part of the chamber wall is porous or perforated.

2. An apparatus according to claim 1, including a gas injection chamber defined between the chamber wall and an outer wall.

3. An apparatus according to claim 1, wherein the gas injection means further comprises a gas injection device located upstream of the inlet chamber.

4. An apparatus according to claim 3, wherein the gas injection device includes at least one nozzle for injecting gas into the oil/water mixture flowing into the inlet chamber.

5. An apparatus according to claim 4, wherein the gas injection device includes a plurality of nozzles.

6. An apparatus according to claim 1, wherein the elongate separation chamber has a length in the range five to ten times its minimum diameter.

7. An apparatus according to claim 1, further comprising a reverse flow cyclonic separator comprising an inlet for receiving the first fluid from the first outlet, a separation chamber for separating the second fluid by cyclonic action into a third fluid and a fourth fluid, an outlet for the third fluid and an outlet for the fourth fluid.

8. An apparatus according to claim 7, further comprising a second reverse flow cyclonic separator comprising an inlet for receiving the second fluid from the second outlet, a separation chamber for separating the second fluid by cyclonic action into a fifth fluid and a sixth fluid, an outlet for the fifth fluid and an outlet for the sixth fluid.

9. An apparatus according claim 8, wherein each reverse flow cyclonic separator is substantially conical in shape, having a length in the range ten to twenty times its maximum diameter.

10. A method of separating water from an oil/water mixture, the method including feeding the oil/water mixture to a uniaxial cyclonic separator comprising an elongate separation chamber, an inlet comprising a spiral-shaped inlet chamber at a first end of the separation chamber, and first and second outlets at a second end of the separation chamber, at least one of said first outlet and said second outlet comprising a spiral-shaped outlet chamber, the method further including injecting gas into the oil/water mixture to form a mist of gas bubbles within the oil/water mixture, subjecting the mixture of oil/water and gas bubbles to cyclonic action within the uniaxial cyclonic separator to cause cyclonic separation of the mixture into a denser first fluid and a less dense second fluid, and drawing off the first and second fluids separately from the uniaxial separator, wherein the gas is injected into the oil/water mixture while subjecting the oil/water mixture to cyclonic action by injecting the gas into the oil/water mixture through a chamber wall of the cyclonic separation chamber that is at least partially porous or perforated.

11. A method according to claim 10, wherein gas is additionally injected into the oil/water mixture before subjecting the oil/water mixture to cyclonic action.

12. A method according to claim 11, wherein the gas that is additionally injected into the oil/water mixture before subjecting the oil/water mixture to cyclonic action is injected through at least one nozzle located upstream of the uniaxial separator.

13. A method according to claim 10, wherein the injected gas comprises from 5 to 20% by volume of the oil/water mixture.

14. A method according to claim 13, wherein the injected gas comprises bubbles having a maximum size in the range 1 to 50 microns.

15. A method according to claim 10, further including delivering the first fluid to a reverse flow cyclonic separator, and separating the first fluid by cyclonic action into a third fluid and a fourth fluid, the third fluid being denser than the fourth fluid.

16. A method according to claim 15, further including delivering the second fluid to a second reverse flow cyclonic separator and separating the second fluid by cyclonic action into a fifth fluid and a sixth fluid, the fifth fluid being denser than the sixth fluid.

17. A method according to claim 15, further including sensing the composition of the third fluid and controlling the flow thereof, according to the sensed composition of the third fluid.

18. A method according to claim 17, further including injecting gas into the fluids in the first and/or second reverse flow cyclonic separator.

19. A method according to claim 10, further including delivering the first fluid to a reverse flow cyclonic separator, and separating the first fluid by cyclonic action into a third fluid and a fourth fluid, the third fluid being denser than the fourth fluid, wherein the third fluid comprises less than 1% oil.

20. A method according to claim 19, wherein the third fluid comprises by volume 40-70% of the oil/water mixture.

21. An apparatus for separating water from an oil/water mixture, the apparatus including a uniaxial cyclonic separator comprising an elongate separation chamber for separating the oil/water mixture by cyclonic action into a first fluid and a second fluid, an inlet at a first end of the separation chamber for receiving the oil/water mixture, said inlet comprising a spiral-shaped inlet chamber, a first outlet for the first fluid at a second end of the separation chamber, a second outlet for the second fluid at the second end of the separation chamber, at least one of said first and second outlets comprising a spiral-shaped outlet chamber, and gas injection means for injecting a gas into the oil/water mixture to aid separation within the separation chamber, wherein the gas injection means comprises means for injecting gas through a chamber wall of the separation chamber, at least part of the chamber wall being porous or perforated, and wherein the gas injection means further comprises a gas injection device located upstream of the inlet chamber, the gas injection device including at least one nozzle for injecting gas into the oil/water mixture flowing into the inlet chamber.

22. A method of separating water from an oil/water mixture, the method including feeding the oil/water mixture to a uniaxial cyclonic separator comprising an elongate separation chamber, an inlet comprising a spiral-shaped inlet chamber at a first end of the separation chamber, and first and second outlets at a second end of the separation chamber, at least one of said first outlet and said second outlet comprising a spiral-shaped outlet chamber, the method further including injecting gas into the oil/water mixture to form a mist of gas bubbles within the oil/water mixture, subjecting the mixture of oil/water and gas bubbles to cyclonic action within the uniaxial cyclonic separator to cause cyclonic separation of the mixture into a denser first fluid and a less dense second fluid, and drawing off the first and second fluids separately from the uniaxial separator, wherein the gas is injected into the oil/water mixture while subjecting the oil/water mixture to cyclonic action by injecting the gas into the oil/water mixture through a chamber wall of a cyclonic separation chamber that is at least partially porous or perforated, and wherein gas is additionally injected into the oil/water mixture before subjecting the oil/water mixture to cyclonic action through at least one nozzle located upstream of the uniaxial separator.

* * * * *